United States Patent [19]
Eberhardt

[11] 3,918,681
[45] Nov. 11, 1975

[54] VALVE SEAT INSERT
[75] Inventor: H. Alfred Eberhardt, Paoli, Pa.
[73] Assignee: Hale Fire Pump Company, Conshohocken, Pa.
[22] Filed: May 30, 1974
[21] Appl. No.: 474,375

[52] U.S. Cl. .................. 251/317; 251/172; 251/363
[51] Int. Cl.² .......................................... F16K 5/00
[58] Field of Search ........... 251/170, 171, 172, 315, 251/317, 363

[56] References Cited
UNITED STATES PATENTS
| | | | |
|---|---|---|---|
| 2,886,282 | 5/1959 | Miller | 251/172 |
| 3,361,407 | 1/1968 | Sachnik | 251/317 |
| 3,486,733 | 12/1969 | Gordon | 251/172 |

Primary Examiner—Harold W. Weakley
Attorney, Agent, or Firm—Howson and Howson

[57] ABSTRACT

The present disclosure relates to a valve comprising a casing having inlet and outlet ports and a rotary valve element operable between a closed position blocking flow between the inlet and outlet ports and an open position permitting flow therethrough. An annular seal seat insert is mounted in a pocket formed in said casing for axial movement therein and is in registry with one of the ports and in sealing engagement with the valve element. A sealing ring is mounted in the pocket and engageable by the seal seat insert. The seal seat insert comprises a reinforcing member having a generally cylindrical annular portion underlying the pocket and an offset outwardly directed flange and an insert housing made of a resilient material at least partially encapsulating the reinforcing member on the surface thereof confronting the valve element and including a bulbous section adjacent the flange portion having a peripheral bead engageable with the valve element and rear face engaging the sealing ring.

7 Claims, 3 Drawing Figures

VALVE SEAT INSERT

The present invention relates generally to valves and more particularly to a new and improved type of valve seat insert.

The valve seat insert for the present invention is particularly adapted for use in all type of in-line valves comprising a casing having inlet and outlet ports and a ball with a valve opening therethrough, which is rotatable in the housing between open and closed positions. A rotary valve of this type is shown and described in the Wendell U.S. Pat. No. 2,916,254, entitled "Rotary Valves", issued on Dec. 8, 1959. As illustrated therein, the assembly usually includes a resilient sealing element engageable with the ball to provide a seal when the valve ball is in the closed position regardless of which side the pressure is applied. Typically, these resilient sealing elements were mounted in a metallic retainer, which is crimped or folded over the resilient seal to hold it in place. This type of valve seat insert has several disadvantages and drawbacks. For example, in folding the flange of the disc-like holder over the resilient seal, the contour of the seal is undulating and presents the possibility of leakage when engaging the ball element. Additionally, when the lip of the reinforcing disc is peened over the resilient sealing element, the resilient element which is usually made out of rubber, is placed under high tensile stress. It has been found that this contributes to premature wear and cracking of the resilient sealing element and, thus requires a frequent replacement of the entire assembly.

With the foregoing in mind, an object of the present invention is to provide a novel valve seat insert for use particularly in ball type valves, which is characterized by novel features of construction and arrangement providing certain functional advantages over prior valve seats discussed above.

Another object of the present invention is to provide a novel valve seat insert which is of comparatively simplified construction which is easy and economical to manufacture and readily assembled in a valve.

A further object is to provide a resilient seal seat that will not distort appreciably or collapse when the valve is gated (opened partially).

These and other objects of the present invention are the various features and details of construction of a valve seat insert in accordance with the present invention and more fully set forth with reference to the accompanying drawing wherein.

Figure 1:
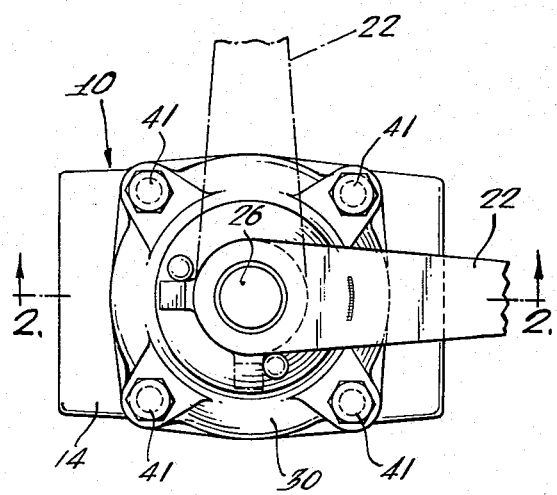
FIG. 1 is a plan view of a ball type valve incorporating a valve seat insert constructed in accordance with the present invention.
Figure 2:
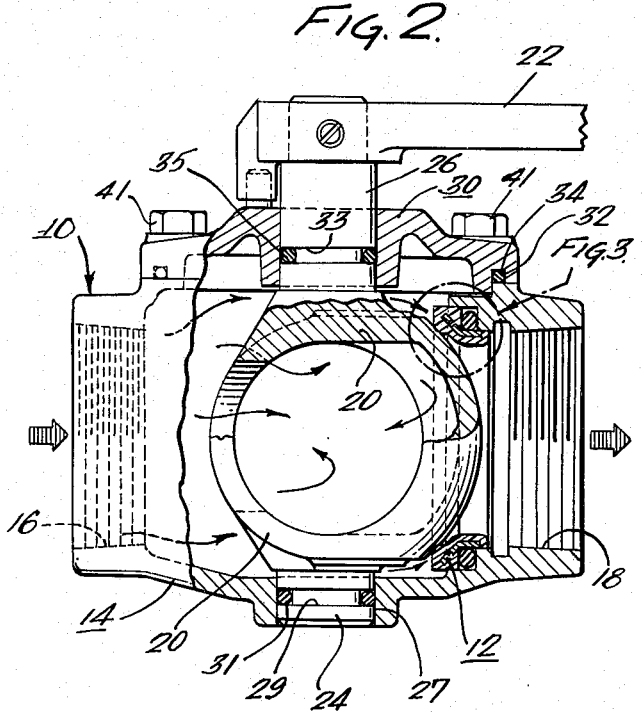
FIG. 2 is an enlarged sectional view taken on lines 2—2 of FIG. 1.

Referring now to the drawings and particularly to FIG. 2 thereof there is illustrated a valve generally designated by the numeral 10 incorporating a novel valve seat insert 12 constructed in accordance with the present invention.

The valve comprises a body member 17 having inlet and outlet ports 16 and 18 respectively which as illustrated are threaded to facilitate connection in a line system to inlet and outlet pipes or conduits respectively. (With this design these ports may be reversed). The valve body mounts therein a rotatable stem ball 20 actuatable between open and closed positions by means of a handle 22. The ball 20 as illustrated is of generally spherical configuration having a pair of oppositely extending trunnion portions 24 and 26 respectively, the trunnion 24 engageable in an opening 27 in the body 14 having a recessed groove 29 for an O-ring 31 to provide a seal between these members. The ball is rotated between open and closed positions through the handle 22. The trunnion 26 likewise has a reduced circumferential groove 33 for seating an O-ring 35 and projects through a cover 30 engaged over the opening in the body to permit access and assembly of the ball. The outer end of the trunnion 26 mounts the handle 22. The cover 30, as illustrated, is secured to the valve body by means of cover screws 41, the cover having a circumferentially extending groove 32 in the face thereof confronting the edge of the body portion defining the opening for a seal such as an O-ring 34.

The valve insert generally designated by the numeral 12 comprises a ring-like metal insert 36 and a casing made of a flexible resilient material at least partially encapsulating the insert 36. The insert 36 may be formed from tubing to the desired configuration shown by conventional means and as illustrated, is of generally Z-shaped cross section comprising a cylindrical portion 40, an offset outwardly directed central flange portion 42 which in the present instance is a frustoconical section press formed and disposed at an angle of about 45 relative to the cylindrical portion 40 and a generally cylindrical lead portion 42a. The central portion 42 may be provided with a plurality of circumferentially spaced openings 42b providing blocking means for retaining the casing integral with the insert 36.

Formed integrally with the reinforcing portion of the valve insert is a casing or housing 50 made of a flexible resilient material such as 80–90 durometer Buna N rubber, which as illustrated, is bonded to the reinforcing member and has a portion 52 underlying the confronting the inner peripheral face of the cylindrical portion 40 of the reinforcing member and a short outwardly directed radial flange portion 54 covering the outer axial end edge and a bulbous section 56 completely encapsulating the frustoconical portion 42 of the reinforcing member. The bulbous section 56 of the casing 50 is formed with an outer surface 58 parallel to the axis of the insert. The inner portion of the casing 50 encapsulating the inner face of the frusto-conical section 42 of the reinforcing member comprises a narrow strip terminating in a radiused circumferentially extending bead 59 which engages the spherical face of the ball element to provide an effective seal therewith.

The body member 14 has a stepped configuration adjacent the port 18 to define a seat for the insert. More specifically, the outlet port has a cut-out adjacent the inner end thereof providing an annular pocket 60 formed by an axial outer wall 62 in the body 50, a radial wall 64 in the body, a parallel radial wall 95 in the seal seat element and a circumferentially extending inner wall portion 66 in the seal seat. The relative dimension of the valve seat insert and the stepped portion of the housing 14 is such that in the assembled relation, the bulbous portion engages the outer cylindrical wall portion 62 and a portion of the cylindrical reinforcing member confronts the inner wall portion 66 providing the completely enclosed pocket 60 for a seal such as an O-ring 72.

The O-ring seal 72 and valve seat insert 12 are constructed and arranged in a particular manner to effectively set the stem ball 20 and preclude leakage for bypassing of the valve regardless of the magnitude of the pressure or direction of the fluid flow through the valve as explained in detail hereinafter.

Figure 3:
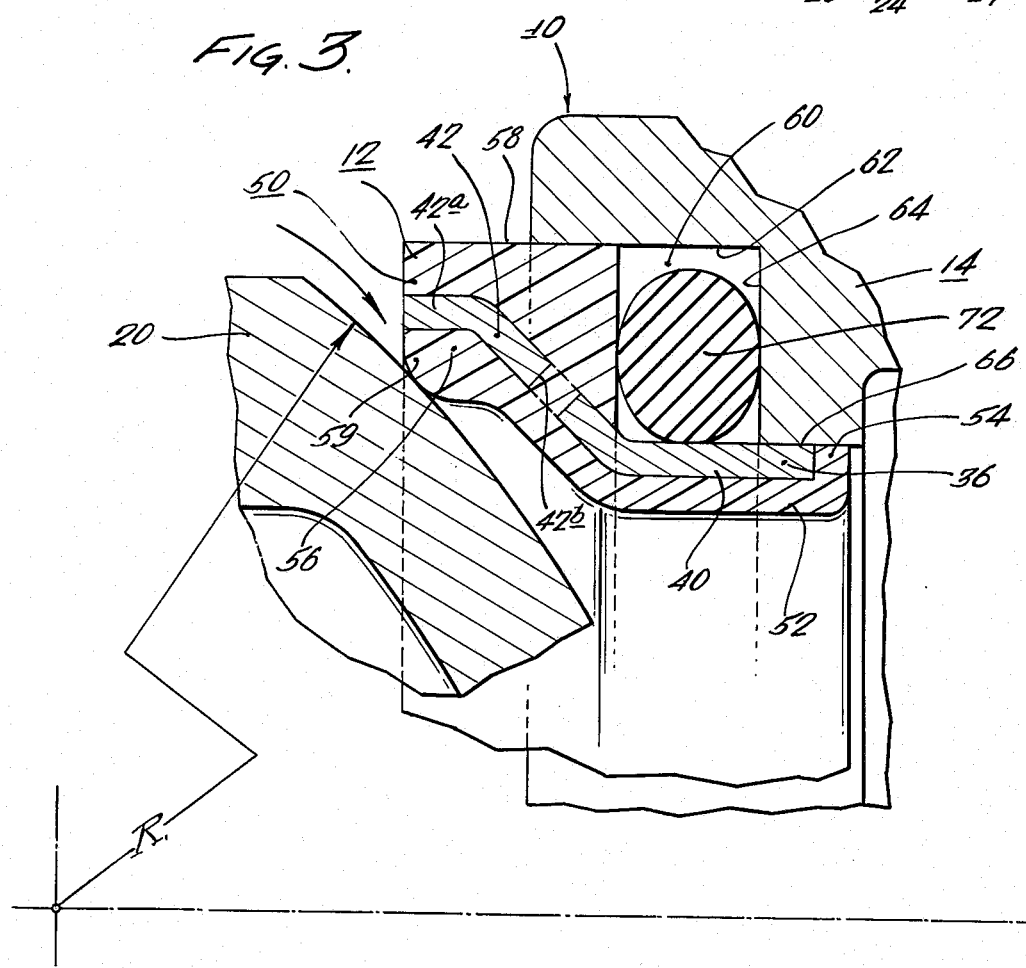
FIG. 3 is an enlarged sectional view of a portion of the assembly encircled in FIG. 2.

The O-ring seal 72 is preferably made of a resilient substantially non-compressible material, soft enough to flow under pressure and assume various positions in the annular pocket 60 depending on the position of the stem ball 20. The function of the O-ring seal 72 is to seal and prevent leakage through the juncture between the valve seat insert 12 and the confronting walls of the casing or body member 17. For example, the O-ring seal 72 is of a greater diameter than the axial dimension of the annular pocket 60 so that when the stem ball 20 is inserted in the casing by first presenting the end of the loosely fitted trunnion 24 in the bore 27 of the casing and then moving the ball stem 20 laterally into pressure engagement with the valve seat insert 12, the insert 12 may be displaced axially to the extent required to admit the trunnion 24 in the bore 27 and to subsequently secure the cover 30 to the casing. In this operation, the resilient bulbous section of the insert 12 as well as the O-ring seal 72 will be placed under axial pressure and will in effect be preloaded. Thus, if the inlet port 16 is connected to the pressure source and the valve ball 20 is closed, there will be a tendency toward leakage between the insert 12 and the casing wall from the valve chamber 16a to the outlet port 18. In such case, pressure fluid entering the pocket 62 will tend to contract the O-ring seal 72 radially inwardly as shown in FIG. 3. In this contractive movement the O-ring seal 72 sets firmly against the cylindrical portion 40 of the reinforcing member and against the axial outer wall 62 of the pocket 60 to provide a positive seal and at the same time exert increasing axial pressure against the insert in the direction of the valve ball 20 to provide a positive seal therebetween.

When the valve is closed, and fluid pressure is applied to the outlet port 18, the O-ring seal 72 is displaced radially outwardly to provide a seal at the outer periphery of the pocket 60 and in the manner described previously urge the insert into pressure applying relation with the stem ball 20.

What is claimed is:

1. A valve comprising a casing having inlet and outlet ports and a rotary valve element operable between a first position closing flow between said ports and a second position permitting flow therethrough, an annular seal seat insert mounted for axial movement in a pocket formed in said casing in registration with one of said ports and in sealing engagement with said valve element, a sealing ring mounted in said pocket and engageable by said seat seal insert, said seat seal insert comprising a generally cylindrical annular portion underlying said pocket and an offset outwardly directed flange and an insert housing made of a resilient material at least partially encapsulating said reinforcing member on the surface thereof confronting said valve member and including a bulbous section adjacent the flange portion having a peripheral bead engageable with said valve element and rear face engaging said sealing ring.

2. A valve as claimed in claim 1 wherein the radial depth of said pocket is greater than the maximum radial cross section of said sealing ring in the relaxed state so that when the valve element is in a closed position fluid pressure in said pocket resulting from pressurized fluid in either port will displace said sealing ring radially in said pocket into compressive engagement with said insert and wall of said pocket which is relatively remote from the port from which pressure is applied and expand said sealing ring axially to seal the potential leakage path along radial sidewalls defining said pocket.

3. A valve as claimed in claim 1 wherein the frusto-conical flange is outwardly directed relative to said cylindrical annular portion at an angle of about 45.

4. A valve as claimed in claim 1 wherein said pocket is defined in part by a stepped configuration in said casing including generally parallel inner and outer radially spaced axially extending wall portions connected by a generally radially disposed wall portion and wherein the rear face of said bulbous section is generally radially directed and circumferentially extending and confronts and is spaced from said radial wall portion of said pocket.

5. A valve as claimed in claim 4 wherein the diameter of said sealing ring is of a dimension smaller than the radial depth of said pocket.

6. A valve as claimed in claim 4 wherein the cylindrical annular portion of said reinforcing member is of a diameter slightly smaller than the diameter of the inner axial wall portion of said casing to facilitate free axial movement of said insert relative to said casing thereby preloading said sealing ring in said pocket.

7. A valve as claimed in claim 1 wherein said seat seal insert includes a generally cylindrical lead portion projecting from said flange and the edge thereof opposite said cylindrical annular portion and including means defining a plurality of circumferentially spaced openings in said flange.

* * * * *